Nov. 1, 1966  S. J. WALLACE  3,282,491
SOLDERING MACHINE WITH FLUX WIPER ROLLER
Filed Dec. 30, 1964  2 Sheets-Sheet 1
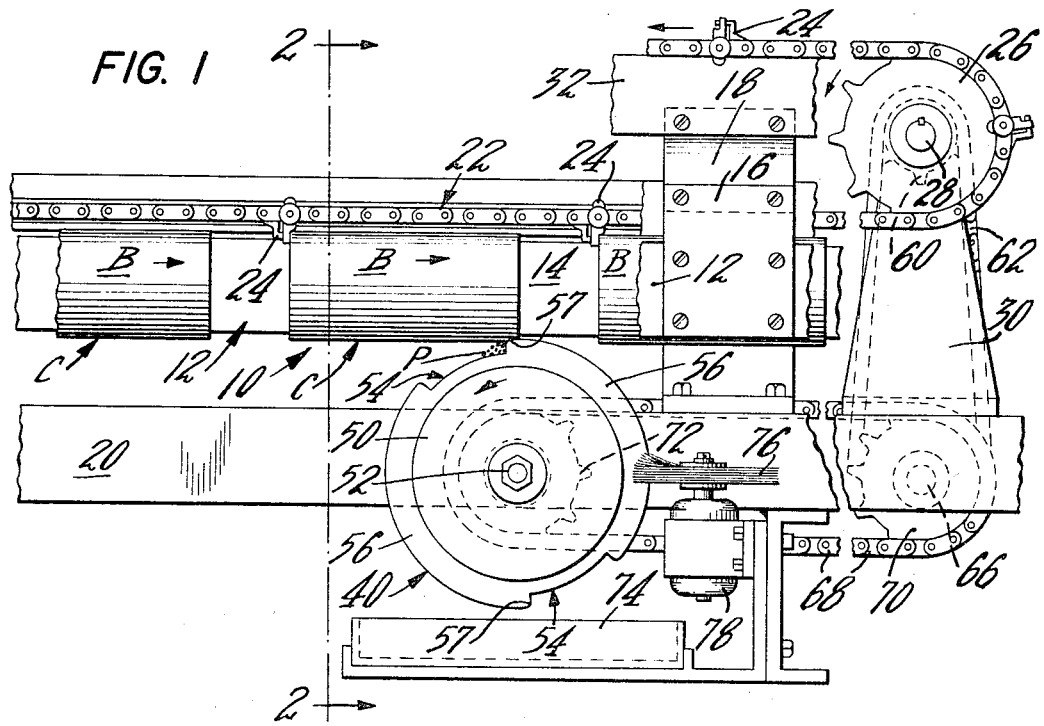
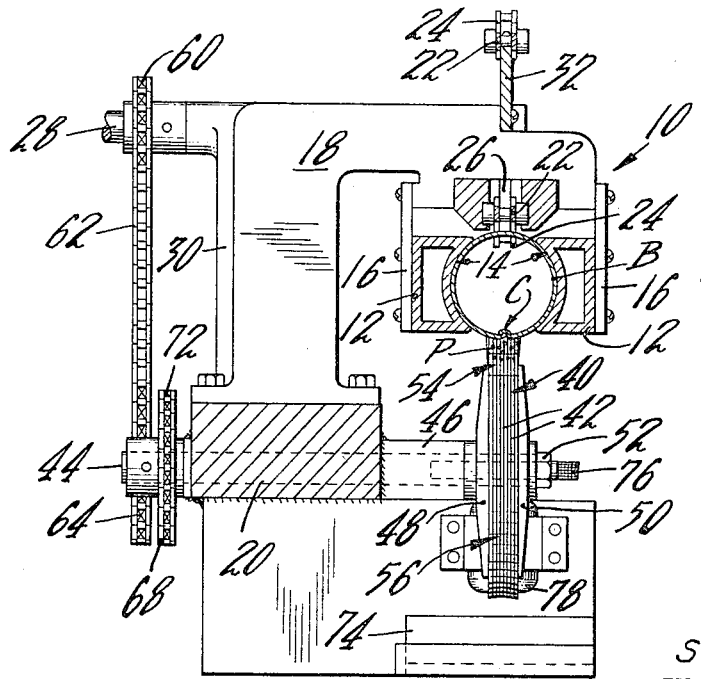
INVENTOR.
SYDNEY J. WALLACE
BY
George P. Ziehmer
ATTORNEY Nov. 1, 1966  S. J. WALLACE  3,282,491
SOLDERING MACHINE WITH FLUX WIPER ROLLER
Filed Dec. 30, 1964  2 Sheets-Sheet 2

INVENTOR.
SYDNEY J. WALLACE
BY
George P. Ziehmer
ATTORNEY

United States Patent Office 3,282,491
Patented Nov. 1, 1966

1

3,282,491
SOLDERING MACHINE WITH FLUX WIPER ROLLER
Sydney J. Wallace, Stamford, Conn., assignor to American Can Company, New York, N.Y., a corporation of New Jersey
Filed Dec. 30, 1964, Ser. No. 422,165
6 Claims. (Cl. 228—22)

The present invention relates to can body soldering machines, and has particular reference to a solder wiper mechanism which utilizes a notched wiper roll which is synchronized with the cans being wiped to minimize the pick-up of solder pellets on the interior surfaces of successive cans as they enter the wiper station.

In the making of can bodies having soldered side seams, it is the usual practice to apply the solder to the can body side seams by passing the bodies in spaced longitudinal alignment through a soldering machine which includes a solder applying roll which rotates in a bath of molten solder. The solder applying roll usually applies an excess of molten solder to the can body, and a rotating solder wiper roll or buff is used in the soldering machine to wipe this excess solder from the bodies.

Considerable trouble has heretofore been encountered in this solder wiping operation because of the fact that pellets of the molten solder which is wiped from each can body enter the open front end of the succeeding can body at the wiping station and solidify when they fall upon its relatively cool interior surface. These solid solder pellets remain in the can and are commercially objectionable.

This pellet problem has hitherto been solved by providing shielding devices which are interposed between successive cans as they pass over the solder wiper roll and provide physical barriers which deflect the molten solder pellets away from the interiors of the cans. An example of such shielding devices is disclosed in United States Letters Patent 2,161,839, granted on June 13, 1939 to C. S. Woolford on Solder Wiper. Such shielding devices, however, have certain disadvantages in that they are expensive and mechanically complicated and are hard to clean and maintain.

Investigation has shown that one of the primary reasons for the entrance of the molten solder pellets into the bodies when no shielding device is used is the fact that the molten solder which is wiped from each can body side seam is not carried away by the rotating roll, but instead, because of its inertia, has a tendency to remain in place at the top of the roll, which continues to rotate beneath it. Thus, since the solder cannot drop downwardly because it is supported in the path of travel of the succeeding can body by the wiper roll, it is scooped up by the open mouth of such can and deposited on its interior surface.

The present invention provides a solder wiping mechanism which solves the pellet problem by providing a peripherally notched wiper roll which is rotated in synchronism with the can bodies so that the unnotched portions of the roll contact and wipe the side seams while the notched wiping portions of the roll coincide with the spacings between the bodies. As a result, the molten solder which is wiped from the bodies by the wiping portions of the roll is not supported by the roll in the path of travel of the succeeding bodies, but instead falls down into the notches and is carried away from the wiping area by the roll and thus is effectively prevented from entering and contaminating the bodies.

An object of the invention, therefore, is the provision of a solder wiper mechanism of simple design which effectively prevents solder contamination of can bodies.

2

Another object is the provision of a solder wiper roll which is suitably notched to eliminate the upward expansion of the compressed, operative portions of the roll into the gaps between successive can bodies and the consequent throwing up of the wiped molten solder into the succeeding open-ended bodies as they pass over the roll.

Yet another object is the provision of a solder wiper roll which is designed to permit the molten solder which is wiped from the can bodies to fall gravitationally out of the path of travel of the bodies so that it does not enter succeeding bodies.

Yet another object is the provision in such a mechanism of means for positively removing the wiper solder from the wiping zone.

Still another object is the provision in such a mechanisms of means for removing the wiped solder from the wiping roll.

Numerous other objects and advantages of the invention will be apparent as it is better understood from the following description, which, taken in connection with the accompanying drawings, discloses a preferred embodiment thereof.

Referring to the drawings:

FIGURE 1 is a side elevation of a can body solder wiper mechanism embodying the instant invention;

FIG. 2 is a sectional view taken substantially along the line 2—2 in FIG. 1:

Figure 3:
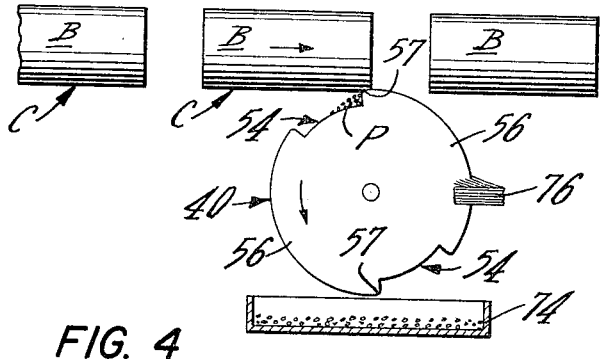
FIGS. 3–6 are schematic elevational views illustrating the mode of operation of the instant wiper mechanism.

As a preferred and exemplary embodiment of the instant invention, FIGS. 1 and 2 illustrate the principal parts of the solder wiping station of a can body side seam soldering machine. In such machine, open ended tubular metal can bodies B having longitudinal side seams C positioned at the bottom of the bodies in longitudinal alignment with one another are conveyed in timed and uniformly spaced relationship along a straight line path of travel extending longitudinally of the machine past the solder wiping section.

Prior to the time the can bodies B reach the wiping station, molten solder has been applied to the side seams C by any suitable solder applying means (not shown), such as a conventional solder applying roll, which applies an excess amount of solder to the side seams C in order to insure a full soldering action.

During the passage of the bodies B through the machine, they are supported and guided by a water cooled outside horn 10 (see FIGS. 1 and 2) which comprises a pair of spaced and parallel hollow guide bars 12 having curved faces 14 which support the can bodies B and maintain them in rounded condition. The guide bars 12 are secured to a plurality of side plates 16 which are spaced at intervals along the machine and are bolted to overlying support brackets 18 mounted on the main frame 20 of the machine.

The can bodies B are propelled along the horn 10 in spaced relationship from left to right, as indicated by the arrow (FIG. 1), by an endless chain conveyor 22 (FIGS. 1 and 2) having feed dogs 24 secured thereto at spaced intervals which are equal in length to the length of a can body B plus the length of the space between successive bodies. The grip dogs 24 are conventional in design and grip the upper rear edge of each body B.

The conveyor 22 preferably extends the full length of the machine and moves continuously at a uniform speed. At the wiper end of the machine which is illustrated in FIGS. 1 and 2, the conveyor operates around a drive sprocket 26 which is keyed to a drive shaft 28 which is journaled in a bracket 30 which is secured to the main frame 20. The shaft 28 is rotated in any suitable manner as by a drive chain (not shown) which connects with the drive shaft of the bodymaker which is disposed in the can line immediately ahead of the soldering machine. The upper flight of the conveyor 22 preferably rides on and is supported by a plate 32 which is secured to the brackets 18.

The excess solder which is applied to side seams C is removed from the can bodies B as they are conveyed through the wiper station by a solder wiper roll 40 which preferably is constructed of a plurality of laminations 42 of a suitable wiping material such as cotton cloth or woven glass fibre material (Fiberglas).

The wiper roll 40 is secured to and rotates with a shaft 44 which is journaled for rotation in a bearing 46 (FIG. 2) which is carried by the main frame 20, the roll 40 being disposed below the conveyor 22 and in vertical alignment therewith so that as the bodies B are conveyed along the horn 10, their side seams C are brought into pressured wiping engagement with the periphery of the wiper roll 40, which normally projects just slightly upwardly beyond the path of travel of the side seams C.

The laminations 42 of the solder wiper roll 40 are clamped together between a pair of circular clamping plates 48, 50 which are of somwhat smaller diameter than the roll 40, the inner plate 48 being fixedly secured to the shaft 44 and the outer plate 50 being pressed against the outer surface of the roll 40 by a nut 52 which is threaded onto the reduced diameter free end of the shaft 44. As seen in FIGS. 1 and 2, the plates 48, 50 clamp the interposed portions of the roll laminations 42 tightly together, while the outermost, peripheral portion of the roll remains unclamped. As a result, when the roll 40 engages a can body in pressured contact, the contacting portion of the roll is slightly flattened and reduced in diameter, this distortion of the roll configuration being made possible by a spreading of the laminations 42, as best seen in FIG. 2.

Figure 4:
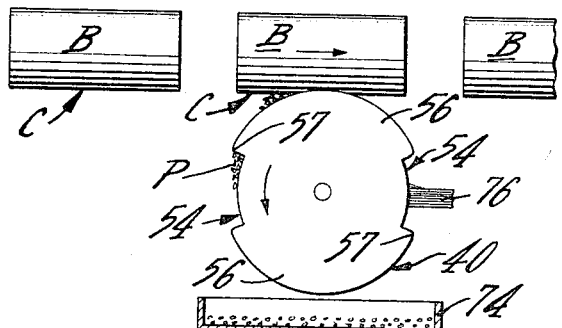
Figure 5:
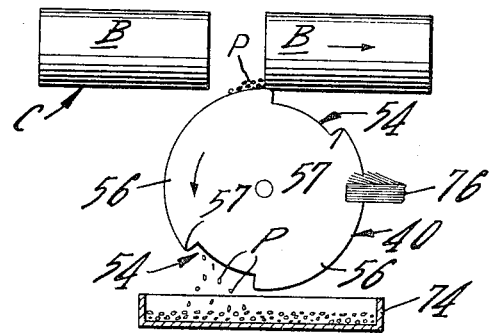

The roll 40 is rotated in a direction counter to the direction of motion of the can bodies B, as indicated by the arrow on the roll 40 in FIG. 1. As each can body B is conveyed across the top of the wiper roll 40 in pressured contact therewith, the excess of molten solder in the area of its side seam C is wiped from the body B by the roll, and accumulates along the line of initial wiping contact, as seen in FIGS. 4 and 5, in the form of a substantial number of small beads or pellets P of molten solder.

It has been found that although the wiper roll 40 is rotated in a direction counter to the movement of the can bodies B the solder pellets P are not carried along with the wiper roll, since the initial momentum of the excess solder is not completely dissipated. As a result, the solder pellets P have a tendency to continue to trail slowly behind the can body B from which they have been wiped.

Figure 6:
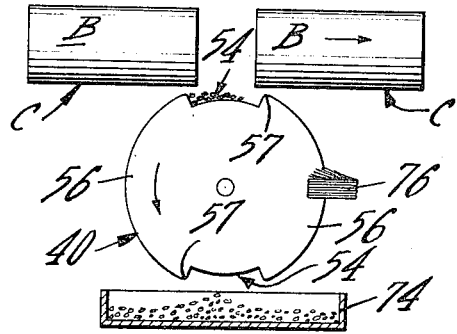

In order to prevent the wiped solder pellets P from being maintained in the path of travel of the immediately succeeding can body B and even being thrown upwardly into such path of travel by expansion of the flattened portion of the roll as the can being wiped passes from engagement with it, the peripheral unclamped portion of the roll 40 is cut away to provide one or more peripheral notches 54 which are adapted to be rotated into position at the top of the roll just as each can body B moves out of contact with the roll 40 and which provide recesses into which the removed solder pellets P can drop under the influence of gravity, as seen in FIG. 6.

In the apparatus shown in FIGS. 1-6 the solder roll 40 is provided with two notches 54 which are of equal length and are spaced equidistantly around the roll periphery, thus providing two unnotched wiping segments 56 of equal length. Thus, this roll 40 wipes two cans during each revolution.

Figure 7:
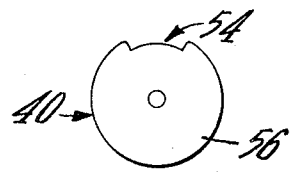
FIGS. 7 and 8 are elevational views illustrating two other suitably notched wiper roll profile modifications.
Figure 8:
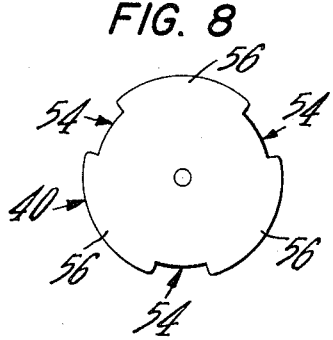

FIGS. 7 and 8 show modified forms of the invention wherein one and three notches 54 and one and three wiping segments 56, respectively, are provided. Such rolls would wipe one and three can bodies, respectively, during each revolution.

The number of notches 54 is not critical, provided that each of the unnotched wiping segments 56 of the roll is of sufficient length to fully wipe the side seam C of a can body B, and the notches 54 are of sufficient length to be in position at the top of the roll while the gap between successive bodies is present there. Preferably, the wiping segments 56 contact the can body B slightly before it reaches the vertical center line of the wiper roll (see FIG. 3) and remain in engagement with it until after it passes this center line (see FIG. 5) to insure a full wiping operation. If desired, the front corner 57 of each wiping segment 56 may be rounded to insure smooth initial contact between the segments and the can bodies.

In order to insure synchronization of the solder roll 40 with the can bodies B, the solder roll 40 is driven from the shaft 28 which drives the chain conveyor 22, thus timing the rotation of the roll 40 to the passage of the feed dogs 24 and consequently to the can bodies B. This synchronized drive is effected (see FIGS. 1 and 2) through a sprocket 60 which is keyed to the shaft 28, a vertical endless chain 62 which operates around the sprocket 60 and around a sprocket 64 which is keyed to a short shaft 66 which is journalled in the main frame 20, and a horizontal endless chain 68 which operates around a sprocket 70 which is keyed to the shaft 66 and around a sprocket 72 which is keyed to the roll shaft 44.

As a result of this timed drive, each side seam C is fully wiped by one of the wiping segments 56 and the solder pellets P which are wiped from each can body fall into the immediately following notch 54, where they are out of the path of travel of the succeeding body which passes over them. When the pellets P contact the surfaces of the notch 54 into which they fall, and especially when they engage the rear wall thereof, their direction of movement is changed and they are carried along by the wiper roll 40 and fall by gravity into a suitable receptacle 74 (see FIG. 6).

If desired, a cleaning brush 76 having flexible bristles may be mounted for rotation by a motor 78 on an axis normal to the axis of the roll 40 so that the brush 76 intersects the roll 40 and enters the notches 54 to positively clean any pellets P which may not have fallen into the receptacle 74 and thus prevent any possible solder build up in the notches 54. The bristles of the brush 76 are preferably of a length to reach the bottom of the notches 54 and are soft enough to deflect and to be deflected by the unnotched peripheral portions of the roll 40 between the notches 54. The solder removed by the brush 76 may be caught and guided into the receptacle 74 by a suitable collector chute (not shown).

It will be understood that a number of variables will affect the wiping action of the instant mechanism. These includes the spacing of the feed dogs 24 and the relative lengths of the can bodies and the spaces therebetween. Generally speaking, any substantial change in any variable may require the substitution of a new wiper roll 40 wherein the lengths of the notches 54 and the segments 56 are varied. However, since the notched rolls 40 can be easily made up simply by cutting notches in a standard circular wiper roll, the cost of the substitution is nominal.

It will also be understood that variations in the solder wiper action may be had by changing the diameter and/or the rotational speed of the wiper roll 40 in order to have a longer or shorter wiping segment 56 available to wipe each can body. In such event, the length of the notch 54 will also be varied to retain the necessary ratios between the lengths of the notches 54 and segments 56 and the spacing between the bodies B and the length of the bodies.

In general, if the peripheral speed of the wiper roll 40 is equal to the lineal speed of the bodies B, the length of each wiper segments 56 will equal the length of the side seam C, and the length of each notch will equal the spacing between successive cans B. If the speed of rotation of such roll is increased relative to the speed of the bodies, the lengths of its segments will be correspondingly increased, while if its speed is reduced, their lengths will be correspondingly decreased.

It is thought that the invention and many of its attendant advantages will be understood from the foregoing description and it will be apparent that various changes may be made in the form, construction, and arrangement of the parts without departing from the spirit and scope of the invention or sacrificing all of its material advantages, the form hereinbefore described being merely a preferred embodiment thereof.

I claim:

1. A solder wiping mechanism, comprising a radially deformable non-metallic wiper roll having at least one operative and one non-operative segment said non-operative segment consisting of a notch in the periphery of said roll, means for feeding articles past said wiper roll in spaced longitudinal procession, and means for timing said wiper roll to the procession of articles so that said operative segments engages at least a portion of the articles fed past said wiper roll.

2. A solder wiping mechanism, comprising a laminated non-metallic radially deformable solder wiper roll, said roll having at least one peripheral wiping segment and at least one peripheral non-wiping notche, means for feeding articles to be wiped past said solder wiper roll in spaced longitudinal procession and in substantial tangentialism thereto, and means for rotating said roll in synchronism with said feeding means to bring said wiper segment or segments sucessively into engagement with said articles and to bring said notch or notches into alignment with the spaces between said articles as said articles are fed past said roll.

3. A solder wiping mechanism, comprising means for conveying articles in uniformly spaced longitudinal procession with the portions of said articles to be wiped aligned in a predetermined straight line path of travel, a laminated non-metallic solder wiper roll disposed adjacent said path of travel with its peripheral portion in substantial tangential relationship therewith said wiper roll being deformable at its periphery by the engagement with said articles, a plurality of evenly spaced notches of uniform length formed in the periphery of said roll, and means for rotating said roll in time with said conveying means to bring said notches into alignment with the spaces between said articles as the latter are conveyed past said wiper roll.

4. The mechanism of claim 3, wherein cleaning means are provided for engagement within said notches during rotation of said wiper roll to continuously remove solder which might accumulate therein.

5. A solder wiping mechanism comprising means for conveying articles in uniformly spaced longitudinal procession with the portions of said articles to be wiped aligned in the predetermined straight line path of travel, a deformable solder wiper roll disposed adjacent said path of travel with its peripheral portion in substantial tangential relationship therewith, a plurality of evenly spaced notches of uniform length formed in the periphery of the said roll, and means for rotating said roll in time with said conveying means to bring said notches into alignment with the spaces between said articles as the latter are conveyed past said wiper roll, cleaning means provided for engagement within said notches to remove solder which might accumulate therein, said cleaning means comprising a brush having flexible bristles which brush is mounted for rotation on an axis normal to the axis of the wiping roll so that the brush intersects said roll and enters the notches to perform the cleaning operation.

6. A solder wiping mechanism for removing excess solder from the side seams of metal can bodies comprising means to uniformly space and convey said bodies in tandem with their side seams in longitudinal alignment, a laminated non-metallic solder wiper roll disposed so as to engage tangentially each side seam in pressured contact as each of said bodies is conveyed past said wiper roll to cause said laminations to spread apart at the periphery of said roll, said roll having a plurality of notches cut in the periphery thereof, each of said notches being of substantially the same arcuate length as the spaces between said spaced bodies, and means for rotating said roll in time with said conveying means to bring said notches into alignment with the spaces as said articles are conveyed past said wiper roll.

References Cited by the Examiner
UNITED STATES PATENTS 1,956,344    4/1934    Coyle _____ 228—23

JOHN F. CAMPBELL, *Primary Examiner.*

M. L. FAIGUS, *Assistant Examiner.*